United States Patent Office 2,796,459
Patented June 18, 1957

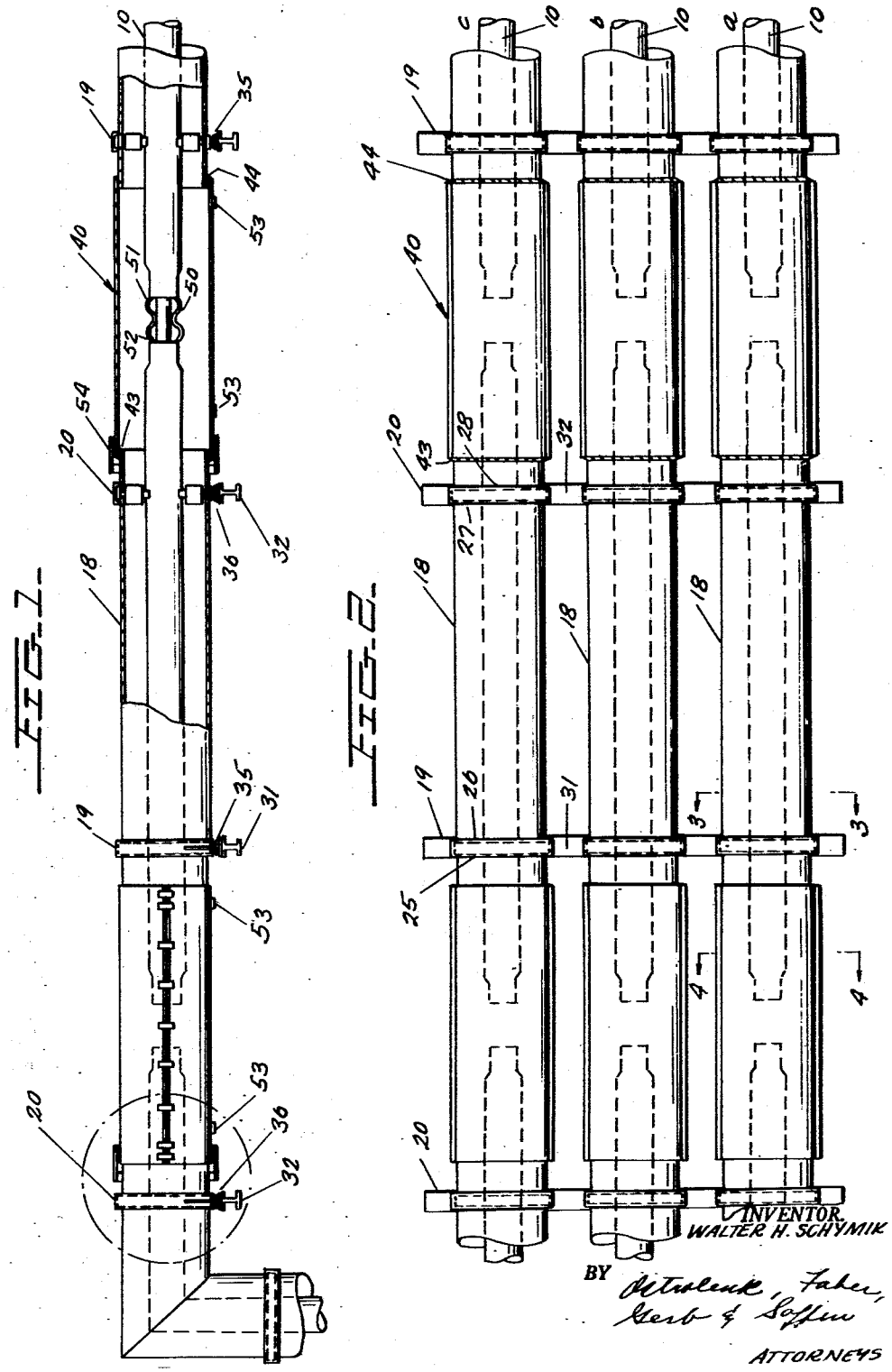

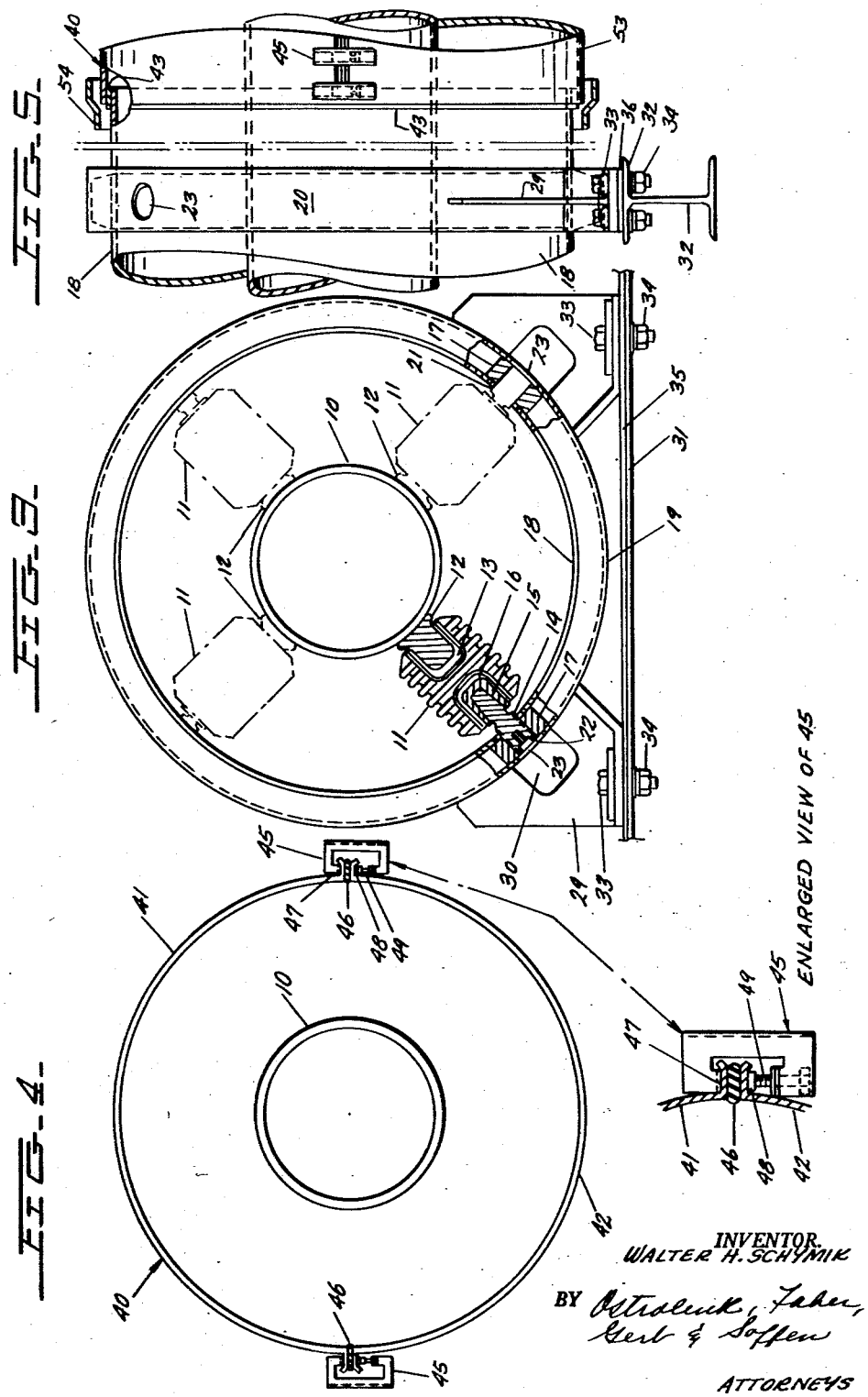

2,796,459

ISOLATED PHASE BUS

Walter H. Schymik, Oreland, Pa., assignor to I-T-E Circuit Breaker Company, Philadelphia, Pa., a corporation of Pennsylvania Application May 13, 1955, Serial No. 508,274

2 Claims. (Cl. 174—99)

My invention relates to a phase bus structure and more particularly it is directed to a novel arrangement whereby the enclosure for the bus is straight without the formation of any pockets or inter-phases so that moisture forming from condensation or moisture collecting by other means can easily flow to filter drains.

Isolated phase bus structures of the type that my invention is directed to are illustrated in U. S. Patents 2,275,203, 2,293,310, 2,335,543 and particularly in my copending application (C–324) Serial No. 493,175, filed March 9, 1955.

In those isolated phase bus structures in which the bus from each phase is enclosed by a metal housing, attempts are made to make the enclosure water-tight so as to prevent moisture from breaking down the dielectric strength of the porcelain supporting insulators and from corroding or damaging the interior of the enclosure.

In some installations, a substantially water-proof structure is achieved by elaborate gasket means or as shown in my copending application (C–324) Serial No. 493,175, filed March 9, 1955, above noted, by welding all sections of the enclosure.

Although the prior art methods have been fairly successful in excluding a large percentage of moisture from the interior of the enclosure, a problem nevertheless exists due to other factors. That is, in a forced air cooled bus, the cooling air may introduce the moisture. In still other installations, there may be the accumulation of moisture within the enclosure resulting from condensation which forms when the generators are shut down or at any time when the temperature on the inside of the enclosure is less than the outside temperature.

It is a primary object of my invention to provide a novel arrangement whereby the accumulated moisture within an isolated phase bus enclosure can readily and easily be drained from the enclosure thereby eliminating the usual troubles which result from condensation.

In a preferred embodiment of my invention, the enclosure consists of circular welded sections which are concentric with and pass through insulator support rings. The insulator supporting rings are welded to the outside of the enclosures. Adjacent welded sections are then coupled together by means of split covers which have a larger inside diameter than the inside diameter of the welded sections. The split covers are provided with a filtered drain at the bottom thereof. This arrangement therefore provides an enclosure wherein the inside along the welded section is straight and does not have any pockets or interphases to block the flow of water. Hence, any moisture which may form from condensation readily flows through the filtered drains which are at a lower level than the level of the welded enclosure.

It will be noted that the welded enclosure sections extend past the insulator and insulator supporting ring. A circular gasket is provided around each end of the welded section against which the coupling split covers are clamped. This arrangement of the gaskets is such that they will be visible for inspection after installation.

In the event that the gaskets are improperly installed or should deteriorate, any moisture which might leak therethrough will drop or flow directly to the drain without touching the insulators. That is, since the portion of the enclosure immediately adjacent the insulator is a welded enclosure, there cannot be any possibility of moisture dripping into the unit at this point. However, since there is a possibility of improper assembly at the point of gasketing, this point is placed near the filtered drain so that any moisture leaking into the enclosure will fall directly to the drain without touching the supporting insulators.

The enclosure of my invention can be provided with the usual grounding protection. That is, the coupling split covers may be grounded by ground strips connected to the welded enclosure and the welded enclosure, in turn, is grounded through the supporting feet of the supporting ring. Alternate supporting rings are grounded and the remaining alternate rings are insulated by insulating only one end of the coupling split cover from the welded enclosure. Circulation currents cannot flow between adjacent enclosures nor through the ground in each single phase run.

Accordingly, a primary object of my invention is to provide a novel enclosure arrangement for an isolated phase bus wherein a major portion of the enclosure is straight without the formation of pockets or interference so that any moisture which may exist within the enclosure can readily flow to a drain positioned in a portion of the coupling means which is situated below the bottom of the main enclosure.

Another object of my invention is to provide an enclosure for an isolated phase bus which will readily drain off any moisture contained within the enclosure with the drain so situated that any moisture which may leak into the enclosure will flow directly to the drain without wetting the insulators.

These and other objects of my invention will be apparent from the following description when taken in connection with the drawings in which:

Figure 1 is a side view of one phase of an isolated phase bus run and illustrates my novel enclosure.

Figure 2 is a plan view of a three phase isolated phase bus run.

Figure 3 is an enlarged cross-sectional view taken in the direction of the arrows 3—3 of Figure 2 and illustrates the manner in which the supporting insulators for the bus pass through the welded enclosure directly to the supporting ring.

Figure 4 is an enlarged cross-sectional view taken in the direction of the arrows 4—4 of Figure 2 and illustrates the manner in which the coupling split covers are secured to each other by means of C clamps.

Figure 5 is an enlarged side view of the portion encircled in Figure 1 and illustrates both the manner of grounding and the manner of clamping the coupling split covers.

Referring to the figures, a main bus 10 is utilized to conduct the current from a source toward the load. The installations to which my invention is directed are usually three-phase and hence, there is a bus 10 for each of the three phases. Since the three phases are substantially identical in construction, it is understood that the side view of Figure 1 represents the side view of all three phases A, B, and C.

The busbar 10 is supported at periodically spaced rings by means of porcelain insulators 11, as best seen in Figure 3. The insulator is provided with a saddle 12 at one end secured in a recess of the insulator by means of cement 13. At the opposite end of the insulator 11, an adjusting stud 14 positioned within an adjusting stud sleeve 15 is secured by means of the cement 16.

The end of the adjusting stud 14 is threaded so that it may be threadably engaged to the block 17 which is positioned between the circular welded section 18 and the supporting ring 19, both of which will now be explained.

The major portion of the housing or enclosure for the bus 10 is comprised of the circular welded section 18. The section 18 may either be initially comprised of two half sections which are subsequently welded along a seam parallel to the axis thereof or may be made of a hollow cylindrical tubing with a continuous circumference. In any event, the section 18 is so constructed that the portion existing between adjacent supporting rings do not require any gasketing or other means to seal out moisture.

The welded section 18 is illustrated as a circular section in the drawings. However, it will be apparent to those skilled in the art that although the circular arrangement provides better characteristics for equal distribution of potential lines and enables better use of the air for dielectric strength, the structure could nevertheless be designed with a square cross-section or any other configuration by having the remaining portions of the structure properly designed to support and couple with the desired configuration.

The welded section 18 passes through the center of two supporting rings 19 and 20. That is, there is a supporting ring at each end of the welded section, supporting ring 19 on the left end and supporting ring 20 at the right end of the section. The outside diameter of the welded section 18 is less than the inside diameter of the insulator supporting rings 19 and 20 and hence, the welded section 18 can pass through the center thereof. The relative dimensions between the welded section 18 and the supporting ring 19 can be seen in the cross-sectional view of Figure 3 which is taken in the direction of the arrows 3—3 of Figure 2.

As best seen in Figure 3, the welded section 18 is provided with openings 21 in the plane of the supporting rings 19 and 20. There are as many openings in the plane of each supporting ring as there are insulators required to support the bus 10. Thus, for example, in the illustration shown, it is assumed that four insulators are required to support the bus and hence, there would be four openings 21 within the welded section 18 in the plane which includes the ring 19 and also in the plane which includes the ring 20.

A plurality of blocks 17 are positioned between the welded section 18 and the insulator supporting rings 19 and 20. The blocks 17 are provided with a threaded opening 22 which is positioned in radial alignment with the openings 21 in the welded section 18. It will be noted that each of the supporting rings 19 are provided with a plurality of openings 23 which also are in radial alignment with the openings 21 in the welded section 18. Thus, in the completed assembly, the adjusting stud 14 passes through the opening 21 in the welded section 18, which opening has substantially larger inside diameter than the outside diameter of the adjusting stud 14.

The insulator adjusting stud 14 is threadably engaged with the threads 22 of the positioning blocks 17. An adjusting stud lock nut 24 is positioned in the end of the adjusting stud 14 and access can be gained thereto through the opening 23 in the channel supporting ring 19.

In the preferred arrangement of my invention, the aluminum channel ring 19 and 20 is welded to the welded section 18. Thus, as seen for phase A of Figure 2, the dark lines 25, 26, 27 and 28, representing the weld seams whereby the channel supporting rings 19 and 20 are secured to the welded section 18, it will be noted that the channel supporting ring 19 has substantially the same construction as the channel supporting ring 20. Thus, the cross-sectional view, seen in Figure 3, for channel supporting ring 19 would also represent the cross-sectional view for the channel supporting ring 20.

The channel supporting ring 20 provides the main support for the bus 10, the enclosures and insulators and is the means by which the weight and force from the buses is transmitted to the cross-supporting structure. The channel supporting ring 19 thus is provided with a pair of legs 29 by which it can be appropriately connected to the supporting means. The legs 29 are provided with an appropriate opening 30 so that access can be gained to the opening 23 and the adjusting stud lock nut 24 of the porcelain insulator 11. These legs 29 are secured to the cross-supporting beams 31 and 32 for the entire isolated phase bus structure.

In accordance with standard practice to eliminate circulating currents between the housings of adjacent phases and within the housing of any one phase, alternate channel supporting rings are grounded, thus, for example, within any one phase.

Each of the channel supporting rings 19, which are positioned at the left end of the welded section 18 would be electrically connected to a grounding bus 35. Thus, as seen in the cross-sectional view of Figure 3, the channel supporting ring 19 is connected to the cross-supporting beams 31 by means of the bolts 33 which pass through a portion of the legs 29 through the grounding bus 35 and are secured to the cross-supporting beam 31 by the nut 34.

As noted, in order to cut down the circulating currents, every other alternate channel supporting ring such as 20 would be insulated from the supporting structure. Thus, in the place where the grounding bus 35 is located for the channel supporting rings 19, an insulating member 36 is positioned for the channel supporting rings 20, as best seen in the enlarged view of Figure 5.

Thus, the completed section comprised of the welded section 18 and its channel supporting rings 19 and 20 has a lower interior section which is in a substantially uninterrupted straight-line. That is, the arrangement on the inside of the welded enclosure is straight without the formation of any pockets or inter-phases so that any moisture which may form from the condensation could easily flow to either end of the enclosure 18 depending upon the tilt thereof.

It should be noted that in many prior art constructions, the enclosure 18 did not extend through the supporting rings such as 19 and 20 and hence, there was a pocket of obstacle for any free flow of the moisture which might accumulate in the enclosure, whereas in the arrangement illustrated, wherein the enclosure 18 passes through the supporting ring 19, there is a substantially straight-line path for the flow of any accumulated moisture. Thus, as noted, the moisture which might accumulate within the enclosure 18 may readily flow to the ends thereof. Means, hereinafter to be described, are provided so that this moisture can readily be removed from the interior of the isolated phase bus structure.

It will be noted that the heretofore described construction of a welded section 18 which in turn is welded to channel supporting rings 19 and 20 which are placed at each end thereof is repeated periodically along the axis of the bus 10. Thus, as best seen, for example, in Figures 1 and 2, the channel supporting ring 20 of one section will be adjacent to the channel supporting ring 19 of a second section and the channel supporting ring 20 of the second section will be adjacent to the channel supporting ring 19 of still a third section. At these adjacent ends of the enclosure 18, respective ends of the bus 10 will protrude and it is therefore necessary to electrically connect these ends to each other.

As seen in the cut away view of Figure 1, expansion connection 50 is welded or bolted to the respective ends of the bus between the ends of adjacent welded sections 18. One end of the expansion connection may be welded or bolted as, for example, at 51 at the factory, and the opposite end, for example, 52 may be welded or bolted at the point of installation.

Since it is essential to completely enclose the bus 10, means must be provided to couple the ends of adjacent welded sections 18. This is accomplished by means of a split cover 40 which may be comprised of an upper half 41 and a lower half 42. The split coupling sections 40 are also seen in the cross-sectional view of Figure 4. It will be noted that as an aid to assembly, it is preferable to construct the coupling sections 40 of two split halves such as 41 and 42 which may then be secured together by either bolts or welded together after they are properly positioned to couple the adjacent ends of the welded section 18. However, if the split halves 41—42 of the coupling section 40 are secured together by either clamps or bolts, then gasket means such as 43 are positioned between the outer circumference at the end of the welded enclosure 18 and the inside circumference of the split section 40. The gasket means 43 may be made of cork or any other desirable means so as to properly seal the interior of the enclosure from moisture. The right hand end of the coupling section 40 is also provided with gasket means 44 which is substantially the same as the gasket means 43.

Thus, after the circular gasket means 43 and 44 are positioned in place between the coupling section 40 and the respective ends of the welded section 18, the split halves 41 and 42 will be secured to each other. In the illustration, the split halves are secured to each other by means of C clamps 45. When this arrangement is used, it is necessary to provide gaskets 46 which extend along a line parallel to the bus 10. That is, the gasket 46, which might also be made of cork or other appropriate gasketing means, is positioned between the halves 41 and 42 to properly seal off the sections.

The C clamps 45 mate with flange sections 47 and 48 of upper half 41 and lower half 42, respectively, and by means of bolt 49 apply sufficient pressure between the halves 41 and 42 to properly seal the interior of the enclosure.

It will be noted that the inside diameter of the coupling sections 40 is larger than the inside and outside diameter of the welded section 18. Thus, although there is also straight line of the interior bottom of the welded section 18 without any pockets or inter-phases to interfere with the flow of water, there is purposely constructed a pocket comprised of the coupling section 40 to which water accumulations can flow. The coupling section 40 to which the water will flow is provided with filtered drains 53 which, as clearly illustrated, are lower than any other portion within the interior of the enclosure. Thus, any moisture accumulation within the enclosure due to condensation resulting from generator shut down, or when the temperature on the inside of the enclosure is less than the outside temperature, or due to water leaking into the enclosure, will eventually drain to the filtered drains 53 due to the construction described and illustrated.

As noted, there are sealing gaskets 43 and 44 located at each end of the coupling section 40. It is always desirable to make the enclosure water tight and water proof, and in some installations, an attempt is made to reach this goal by providing appropriate gasketing. However, this has not proved to be in effect water proof since either the gasketing will eventually deteriorate or the initial installation of the bus will result in improper alignment or positioning of the gasketing means so that some water or moisture may leak into the interior of the isolated phase bus enclosure. Thus, although it is desirable to make the enclosure water proof, it has been found that at best, the enclosure can only be made water tight rather than water proof.

However, with my novel construction, the point of possible leakage, namely, at the circular gaskets 43 and 44, are in a plane which is between the drain 53 and the plane including the supporting insulators 11.

The major reason for eliminating moisture within the enclosure of an isolated phase bus structure is to insure that no moisture will exist on the supporting porcelain insulators to thereby avoid the possibility of a dielectric break down. Thus, with my novel construction, an arrangement is provided wherein any moisture which might possibly leak into the enclosure positioned directly from the point of initial entry to the drain of the enclosure without coming into contact or near the supporting insulators 11. That is, by placing the weak point of the enclosure, namely, the point of gasketing or leakage might occur between the drain and the supporting insulators, a safe construction is automatically provided since the moisture which leaks to the enclosure will not come in contact with the supporting insulators.

With regard to the moisture existing within the enclosure due to the fact that there is condensation resulting from the shut down of the generators or due to the diameter on the inside of the enclosure being less than the diameter on the outside of the enclosure will form on the bottom of the welded enclosure 18 and will readily and easily flow to the drains 53 within the lower coupling section 40. Thus, my novel arrangement readily takes care of both moisture which is in the enclosure due to condensation and also the moisture which is in the enclosure due to defective gaskets.

As heretofore noted, the novel construction of my application also lends itself to proper grounding and insulating arrangements to prevent the circulating currents between phases and metal enclosures of each phase. Thus, the circular gasket means 43 not only serves as a seal for the enclosure of the bus 10 but also serves to insulate the coupling sections 40 from the welded enclosure 18 which is positioned on the right thereof. With regard to the circular gasket 43 positioned on the left end of the coupling section 40, a ground strap is provided between the coupling section 40 and the welded enclosure 18 by positioning the insulating gasket 43. The ground strap 54 has one end electrically secured to the split coupling section 40 and its opposite end electrically secured to the welded section 18.

It will be noted that the entire enclosure including both the welded section 18 as well as the coupling section 40 may be made of metal such as aluminum. In this situation, the entire interior and exterior of the enclosure can be painted thereby preventing formation of aluminum oxide which would otherwise form on the unpainted aluminum when it is exposed to moisture which might be created by condensation or leakage.

In the drawings, I have shown only one embodiment of my invention which incorporates the basic concept and principle of my invention. That is, a novel arrangement whereby a major portion of the bottom interior of the enclosure lies in a substantially straight line without any pockets or protruded obstructions so that water may freely flow to a drain section which is incorporated in a portion which is positioned lower than the remaining portion of the enclosure. With this arrangement, the possible points of water leakage are positioned between the filtered drain and the insulators so that any moisture which might enter the interior of the enclosure due to a faulty gasket will flow directly from the point of entry to the drain without passing near the supporting insulators.

It will be apparent to those skilled in the art that this general concept can be carried out in a phase bus structure having many arrangements in addition to that shown in the drawings. That is, for example, the halves of the coupling section 40 could be welded together rather than clamped together and/or the entire enclosure for the bus 10 could have the configuration other than circular.

It will also be apparent that my novel invention, although desirable for isolated phase bus structures, can also be applied to both segregated and non-segregated phase bus structures.

In the foregoing, I have described my invention only in connection with preferred embodiments thereof. Many variations and modifications of the principles of my in-

I claim:

1. In a bus structure being comprised of a bus, a plurality of supporting rings, an enclosure and a plurality of insulators; said enclosure being comprised of a plurality of welded sections and coupling sections; said coupling sections having ends with substantially the same configuration as the ends of said welded sections; each of said welded sections passing through two supporting rings, each of said supporting rings respectively being positioned inwardly from the ends of said welded sections; insulators in the plane of each supporting ring having means at one end to support said bus and the other end passing through said welded enclosure to said supporting ring; a coupling section positioned between each pair of adjacent welded sections and positioned concentric with respect to said bus; gasket means positioned at the ends of said coupling sections and the ends of said welded sections and physically removed from said supporting rings; said gasket means being positioned concentric to said bus and being visible from the exterior of said enclosure for inspection after installation; said coupling sections having inside dimensions larger than the inside dimensions of said welded sections; each of said coupling sections having a drain at the bottom thereof to drain off moisture accumulations within said enclosure; said gasket means positioned in a plane between said drain and said insulators.

2. In an isolated phase bus structure being comprised of a bus, a plurality of supporting rings, an enclosure and a plurality of insulators; said enclosure being comprised of a plurality of welded sections and coupling sections; said coupling sections having ends with substantially the same configuration as the ends of said welded sections; each of said welded sections passing through two supporting rings; each of said supporting rings respectively being positioned inwardly from the ends of said welded sections; insulators in the plane of each supporting ring having means at one end to support said bus and the other end passing through said welded enclosure to said supporting ring; a coupling section positioned between each pair of adjacent welded sections and positioned concentric with respect to said bus; gasket means positioned at the ends of said coupling sections and the ends of said welded sections and physically removed from said supporting rings; said gasket means being positioned concentric to said bus and being visible from the exterior of said enclosure for inspection after installation; a ground strap at one end of each of said coupling sections electrically connected to the welded section adjacent thereto; said ground strap providing an electrical bypass for one of said gasket means between said coupling means and said welded section; alternate supporting means electrically grounded from every other alternate supporting means electrically insulated from the supporting structure for said isolated phase bus; said grounding strap with said insulated and grounded supporting rings preventing the circulation of current between adjacent enclosures and within the enclosures of each phase; said coupling sections having inside dimensions larger than the inside dimensions of said welded sections; each of said coupling sections having a drain at the bottom thereof to drain off moisture accumulations within said enclosure; said gasket means positioned in a plane between said drain and said insulators.

References Cited in the file of this patent

UNITED STATES PATENTS

| | | |
|---|---|---|
| 1,982,152 | Mask | Nov. 27, 1934 |
| 2,335,543 | Rudd | Nov. 30, 1943 |
| 2,531,017 | West | Nov. 21, 1950 |
| 2,664,456 | Schymik | Dec. 29, 1953 |